April 29, 1958 R. J. PIERCEY 2,832,379
LOG DECK AND TURNING MECHANISM FOR LOG SAW MILLS
Filed April 19, 1955 5 Sheets-Sheet 1

Inventor
Roger J. Piercey
By A. John Michel
Attorney

April 29, 1958 R. J. PIERCEY 2,832,379
LOG DECK AND TURNING MECHANISM FOR LOG SAW MILLS
Filed April 19, 1955 5 Sheets-Sheet 2

Inventor
Roger J. Piercey
By J. John Michel
Attorney

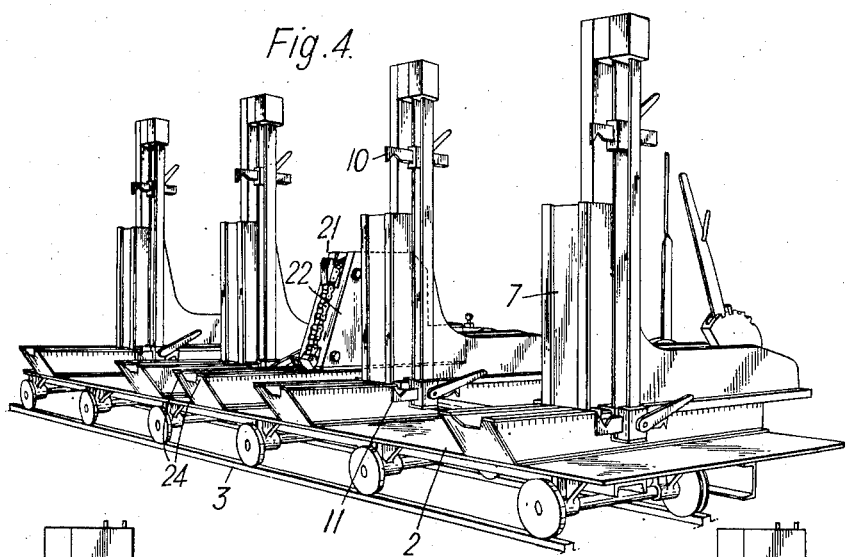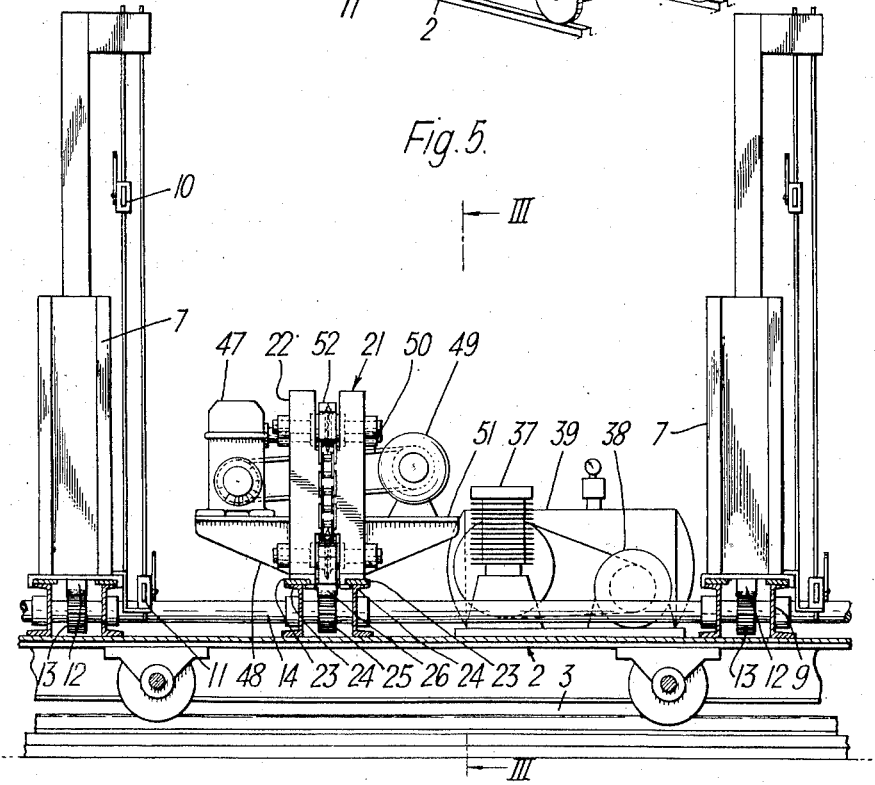

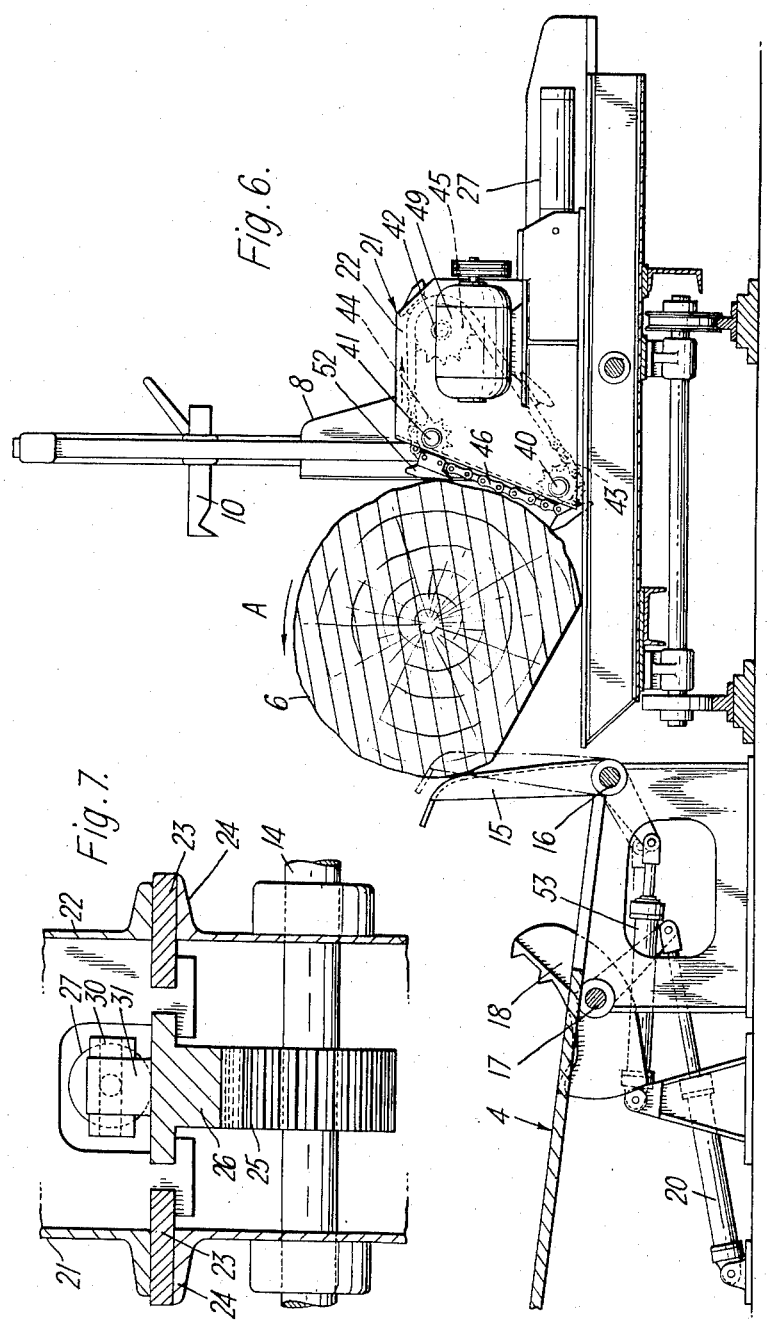

United States Patent Office 2,832,379
Patented Apr. 29, 1958

2,832,379

LOG DECK AND TURNING MECHANISM FOR LOG SAW MILLS

Roger J. Piercey, Tiverton, Devon, England, assignor to Stenners of Tiverton Limited, Tiverton, Devon, England Application April 19, 1955, Serial No. 502,350

Claims priority, application Great Britain April 27, 1954

7 Claims. (Cl. 143—95)

This invention concerns improvements in or relating to timber saw-mills of the kind wherein the timber, usually in the form of a log, which is to have flitches, boards or planks cut therefrom, is supported on a longitudinally travelling carriage to which to and fro endwise movements are imparted, first to feed the timber (hereinafter called the "log") along the saw-line to the saw and then to return the carriage to its starting position.

Usually, in saw-mills (hereinafter referred to as "log saw-mills") of this kind the carriage is offset automatically during its return movement to ensure that the log clears the saw, and is finally (i. e. at the end of its return movement) automatically restored to its position on the sawline. In other forms of log saw-mills of this kind, means are provided for offsetting the log on the carriage during the return movement of the latter, thereby to avoid the necessity of displacing the carriage along its axles.

A log to be cut by one of these log saw-mills is placed on the log carriage and is accurately positioned thereon by two or more knees mounted on the carriage at intervals therealong in such a manner as to be adjustable across the carriage so that the log can be advanced towards the saw line or withdrawn from it as required. These knees are usually of an L-shaped form and have their upright limbs adapted to bear against the rear surface (i. e. the surface remote from the saw-line) of the log, and the adjustment of the knees across the carriage is effected manually or automatically through the medium of racks, pinions, and a shaft, known as a "set-shaft," carried by the carriage and under the control of the sawyer or his assistant.

Although the invention is applicable to circular sawmills as well as to band saw-mills, nevertheless the invention is likely to find its widest application in vertical band saw-mills.

There is a wide variety of ways in which a log can be sawn up or converted and the method or combination of methods employed in this operation depends on many factors. Thus it may be desirable to cut up a log by "through and through" sawing (complete parallel end-to-end cuts), by quartering the log, or by a combination of these methods, but in many cases it is desirable first to take off a flitch, and possibly one or more boards or planks, and then to turn the log about its axis to present another face of the log to the saw so that a further flitch and, may be, one or more boards, may be cut off the log, this process being repeated several (usually four) times. It is with this latter type of log conversion that this invention is especially concerned.

It is an object of this invention to provide an improved log turning device incorporating an endless log turner, whereby the log turning operation is expedited, whilst a further object of the invention is to provide a saw-mill, and particularly a vertical band saw-mill, having such an improved log turning device.

It is a further object of this invention to provide, in or for a log saw mill of the kind specified, a log turning device mounted, or adapted for mounting, upon the log carriage for adjustment across the latter, such log turning device comprising log engaging and rotating means including an endless member, e. g. a chain, furnished with dogs or teeth and so arranged that a portion of the said flexible member travels, when the member is in use for log turning purposes, along a predetermined fixed path upwardly and obliquely rearwardly across the rear of a log located on the carriage adjoining and in front of the said knees, and means for adjusting such log turning device as a whole transversely with respect to the log carriage independently of the knees on the latter, and without changing the obliquity of the log engaging portion of the said flexible member whereby, on said log turning device being advanced on the log carriage up to a log, the said dogs or teeth engage the rear of the log and tend to lift the same so that, with the assistance of gravity, the said dogs or teeth so turn the log on the log carriage that the upper part of the log moves forwardly and downwardly with respect to the knees.

The said means for adjusting the log turning device as a whole transversely with respect to the log carriage independently of the knees is preferably so contrived that the log turning device may normally be maintained in such a position that its log engaging means and rotating means are normally out of contact with the log but may be advanced, when desired, so as to project beyond the front faces of the knees in order to engage the log for a log turning operation.

Although the said independent adjustment of the log turning device may be effected in any appropriate manner it is very conveniently achieved pneumatically or hydraulically, for example, through the influence of a pneumatic cylinder and piston assembly under the control of the sawyer or his assistant.

More than one of the said log turning devices may be provided on the log carriage if desired. When a log turning device according to this invention is used in converting a log into a cant of rectangular cross-section, the extent to which the log must be turned at each turning operation is 90° so that the complete angular rotation of the log necessary to effect the cutting of four faces substantially at right angles to one another is 270°.

The portion of the said flexible member (which will preferably be a chain), which extends obliquely upwardly and rearwardly, preferably does so at an angle in the region of 20° to the vertical.

The said log engaging means may comprise dogs or teeth which are carried at intervals along an endless chain passing over a plurality (e. g. three) of suitably spaced guide and driving wheels or sprockets mounted in spaced positions as at the corners of a triangle in a housing or frame of the log turning device, such housing or frame being mounted on, and extending transversely of, the log carriage rather similar to a normal knee with the axes of the said wheels or sprockets parallel to the longitudinal edges of the log carriage. Conveniently the driving wheel or sprocket of the said series of wheels or sprockets is driven, through a reduction gear, by an electric motor via any suitable transmission means, but any other suitable drive may be provided for the driving wheel or sprocket.

To restrain the log from rolling forwardly from the log carriage during a log turning operation, log restraining means may conveniently be provided at the log loading position, e. g. on a log loading deck at the feed end of the saw mill, such restraining means conveniently comprising one or more arms which can be brought into a substantially upright position in front of the log when required and preferably being power operated, e. g. hydraulically or pneumatically operated.

Preferably the said log restraining arms will, according to another feature of the invention, be adapted to engage the log in a resilient or yielding manner so as to give or yield somewhat under the forward pressure of the log as this is turned about its own axis by the log turning device.

The said log restraining arms may also serve as loading means for transferring a log from the loading deck to the log carriage.

The log turning device will preferably be arranged so as normally to move across the log carriage in step with the knees, as these are adjusted, the movement of the log turning device being conveniently achieved by rack and pinion gearing similarly to, and from the same set-shaft as, the knees.

In order that the invention may more readily be understood, one embodiment of the same will now be described, by way of example, with reference to the accompanying drawings and as applied to a log band saw-mill of the kind sold by Stenners of Tiverton Ltd., as type VE; it should, however, be understood that the invention is applicable to other saw-mills as well as to those of this particular make and type.

In the accompanying drawings:

Figure 4 is a perspective view of the log carriage of the saw-mill shown in Figures 1 to 3 with a log turning unit constructed in accordance with this invention applied thereto;

Figure 5 is a longitudinal fragmentary sectional elevation taken on line V—V, Figure 3 and shows a detail of construction;

Figure 6 is a similar section to Figure 3 but shows a log in the process of being rotated by a log turning device according to this invention;

Figure 7 is an enlarged fragmentary section on line VII—VII, Figure 3; and

Figure 1:
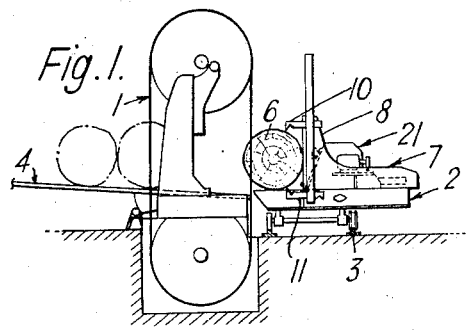
Figure 1 is a diagrammatical end elevation of a band saw-mill of the aforementioned type as seen from the delivery end of the machine and with this invention applied thereto.

The known vertical band saw-mill illustrated in the drawings as having this invention applied thereto comprises, briefly, a vertical band saw unit 1 and a horizontally reciprocating carriage 2 mounted on rails 3 alongside the band saw unit so as to be reciprocable in a direction perpendicular to the plane containing the two vertical runs of the blade. Means, not illustrated, are provided for effecting the reciprocation of the carriage 2 and also for offsetting the carriage, as hereinbefore explained, during its return stroke.

A log loading deck 4 is provided alongside the rails 3 at the feed end of the machine whilst a log unloading deck, not illustrated, is provided at the delivery end of the machine, said loading and unloading decks being arranged on the same side of the rails 3 as the saw unit 1.

After being fed from the log-loading deck 4 on to the carriage 2, a log, such as the log 6 illustrated in the drawings, is accurately positioned longitudinally of the carriage by a plurality of knees 7, there being four of these knees shown in the drawings. These knees are mounted on the carriage 2 at intervals therealong in such a manner as to be adjustable across the carriage so that the log 6 can be advanced towards the saw line or withdrawn from it as required, the knees being of L-shaped form and having their upright limbs 8 adapted to bear at their front surfaces against the rear surface of the log 6 whilst the horizontal limbs of the knees 7 ride upon head blocks 9 provided across the carriage 2 at right angles to the longitudinal edges of the latter. Thus the adjustment of the knees across the carriage effects adjustment of the position of the log 6 upon the carriage and with respect to the saw-line of the machine and determines the thickness of cut to be made through the log.

The knees 7 are adjusted across the carriage through the medium of transverse racks 12 fixed to the knees 7 and which engage with appropriately positioned pinions 13 upon a set-shaft 14 on, and extending longitudinally of, the carriage 2 and the rotation of which shaft is under the control of the sawyer or his assistant, preferably from a remote control box.

The log 6 may be dogged to the carriage 2 by upper and lower dogs 10 and 11 provided on the knees 7, these dogs being adapted to be operated either manually or by power means for causing them to engage the log to secure it upon the carriage or to disengage the log to permit the latter to be rotated about its axis with respect to the log carriage.

The log-loading deck 4 is inclined downwardly towards the saw line of the machine and the front edge of the carriage 2, and is provided with means (hereinafter described) for lifting a log from the deck 4 on to the carriage 2 when this is in its loading position preparatory to making its forward or feed stroke. The log loading deck also has log trip means (subsequently described) for retaining logs against rolling down the log deck unintentionally.

Figure 2:
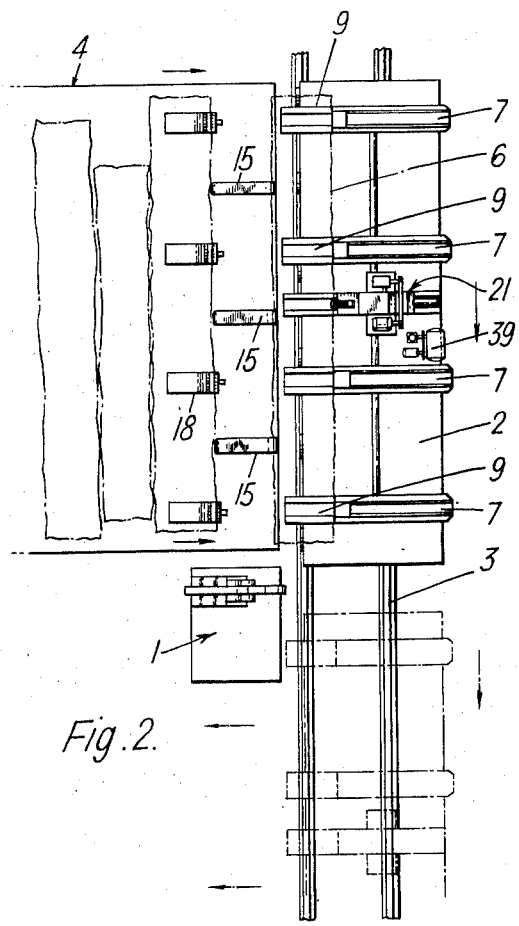
Figure 2 is a diagrammatical plan of the machine shown in Figure 1.

In a machine of the above described type modified to embody this invention, the said log lifting means conveniently comprise a series, e. g. two or three, parallel arms 15 (see for example Figures 2, 3 and 6) arranged at right angles to the saw line of the machine and fixed at their front ends upon a horizontal shaft 16 lying along that edge of the log deck nearest to the log carriage 2 and extending parallel to the front of this carriage, at least the free ends of the said arms normally lying slightly below the downwardly inclined top surface of the log deck 4 but the arms being adapted to be rotated into a substantially vertical position adjoining the front edge of the log carriage in order to raise a log from the log carriage end of the log-loading deck and to transfer such log on to the log carriage itself.

To control the feeding of the logs down the log-loading deck there is provided, parallel to the shaft 16, a horizontal shaft 17 on which are arranged a series (e. g. four) of log trips 18 which are adapted to retain all the logs on the deck, except the foremost log resting upon the arms 15, from rolling down the inclined top surface of the deck. These log trips 18 may be operated in any suitable manner but conveniently are actuated pneumatically or hydraulically through a piston and cylinder assembly 20 and a lever 19 at the command of the sawyer in charge of the machine.

The log turning device, generally indicated by the reference 21, is placed between the centre pair of knees 7 (Figures 2, 4 and 5), and comprises a frame or housing 22 which is conveniently fabricated from welded steel plate and is of elongated rectangular shape in plan, and has its length extending transversely of the carriage 2. This housing is provided at its base with a pair of runners 23 (Figures 5 and 7) which are adapted to ride on a pair of spaced parallel slides 24 fixed upon the carriage 2 at such a distance apart that they register respectively with the runners 23, the slides 24 extending across the carriage parallel to the head blocks 9 which carry the knees 7 and being at right angles to the longitudinal edges of the carriage 2.

The normal adjustment of the housing 22 across the log carriage 2 upon the slides 24 is effected by means of a pinion 25 on the set shaft 14 of the carriage, this pinion engaging a rack 26 located along the base of the housing 22 between the slides 24 and the arrangement being such that the housing is adjusted simultaneously and automatically with the knees 7 across the carriage 2. The rack 26 is not, however, fixed rigidly to the housing 22 in the manner that the racks 12 of the knees 7 are connected to the latter, but is indirectly connected to the housing through a pneumatic cylinder assembly which comprises a cylinder 27 aligned end-on with the housing 22 and having its front end connected by a pin 28 to the rear end of the housing, a piston 29 slidable within the cylinder 27, and a piston rod 30 by one end of which the said piston is carried and which has its other end connected to a lug 31 projecting upwardly from the rack 26 within the housing 22.

Figure 3:
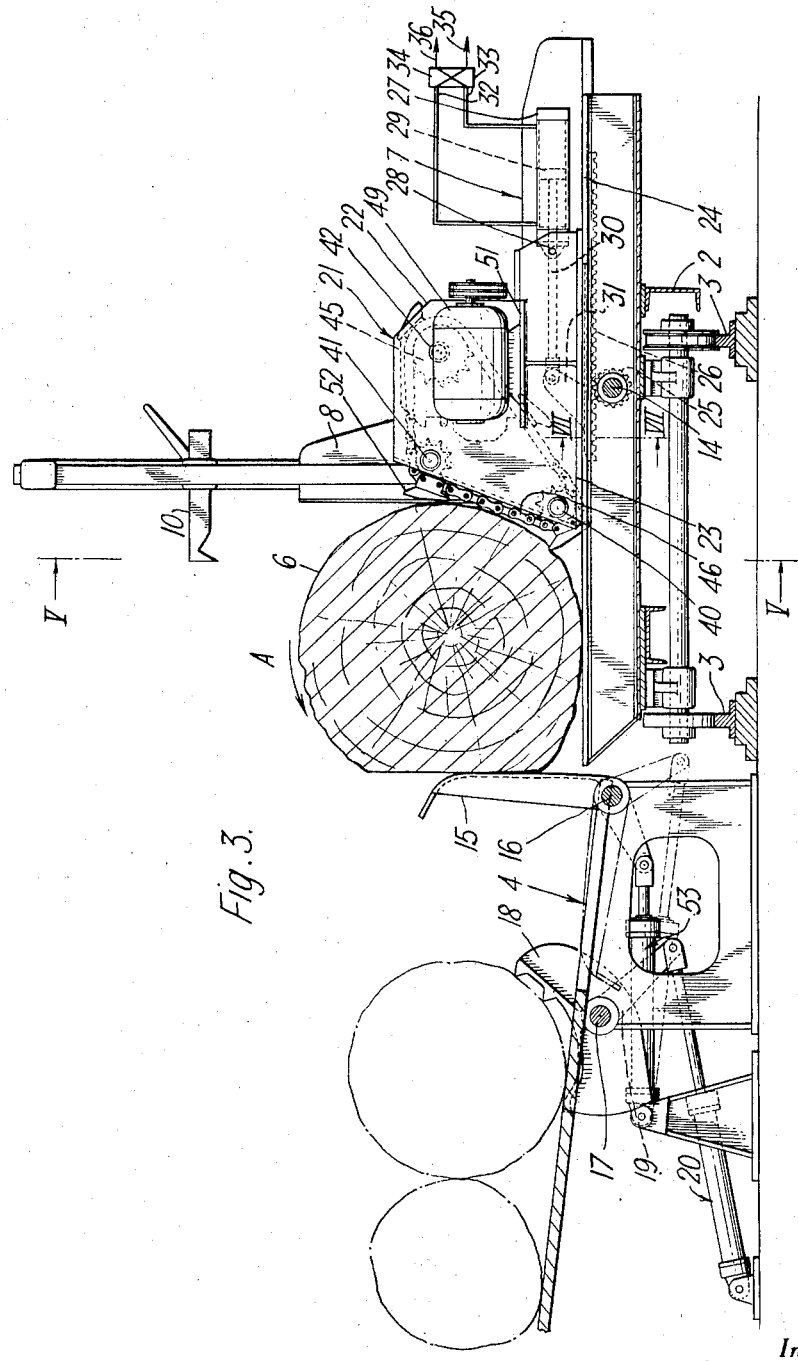
Figure 3 is a cross-sectional elevation of the saw-mill shown in Figures 1 and 2 but drawn to a considerably larger scale, the section being taken on line III—III, Figure 5, and through the forward end of the log loading deck of the saw-mill.
Figure 8:
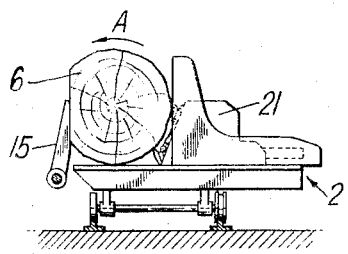
Figures 8, 9, 10 and 11 show diagrammatically the method of turning the log with means in accordance with this invention.
Figure 9:
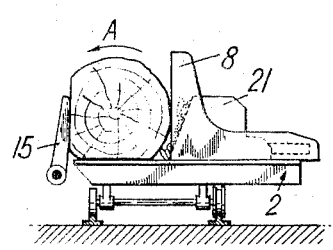
Figure 10:
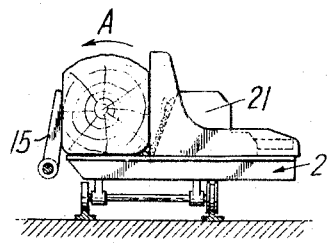
Figure 11:
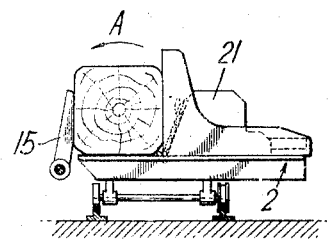

The pneumatic cylinder 27 is a double acting cylinder and its two ends are respectively connected by pipes 32 and 33 to two of the ports of a four-way valve 34 as shown diagrammatically in Figure 3, the said valve preferably being electrically operated by remote control and having an air pressure line 35 and an exhaust line 36 leading respectively to its other two ports. The purpose of the pneumatic cylinder and piston assembly above described will be subsequently referred to, but it will be seen, from Figure 5 in particular, that an air compressor 37 driven by an electric motor 38, and a compressed air reservoir 39 are provided upon the carriage 2 to provide the necessary air pressure for supply to the pressure line 35.

Between the side cheeks of the housing 22 are arranged, as at the corners of a triangle, three horizontal shafts respectively marked 40, 41 and 42 all of which are parallel to the set shaft 14. The shaft 40 is arranged at the front lower corner of the housing 22, the shaft 42 near the upper rear corner of the housing and the shaft 41 forwardly of the shaft 42 but slightly behind the shaft 40 and also slightly above the level of the shaft 42. The front of the housing 22 inclines upwardly and backwardly at about 20° to the vertical and similarly the axes of the two shafts 40 and 41 lie in a common longitudinal plane which is disposed at about 20° to the vertical.

On the two shafts 40 and 41 are respectively arranged sprocket wheels 43 and 44 whilst on the shaft 42 is fixed a substantially larger driving sprocket wheel 45, all these sprocket wheels being located in the vertical longitudinal medial plane of the housing 22. Over these three sprockets passes an endless roller link chain 46 of which the front run passes out of the front of the housing 22 and rides over the upwardly and rearwardly inclined front surface of the housing, the said front surface being continuous except for the provision of gaps or openings at the top and bottom ends thereof to permit of the passage of the chain and dogs thereon (hereinafter referred to) out of and into the housing. The front surface of the housing thus forms a track over which the endless chain can run and by which it is supported against rearward pressure applied thereto by the log 6.

The shaft 42 carrying the sprocket 45 acts as a driving shaft for driving the endless chain 46, and projects endwise from the housing 22 into the casing of a reduction gear 47 mounted upon a shelf 48 projecting laterally from one side of the said housing, this reduction gear having its input shaft driven by an electric motor 49 through a belt 50 or any other suitable transmission means. The motor 49 is mounted upon a further shelf 51 extending laterally from the housing 22 on the other side thereof to the shelf 48. Thus operation of the motor 49 causes the endless chain 46 to be driven about the sprocket wheels 43, 44 and 45 so that the front run of the chain rides upwardly over the front surface of the housing 22, the sprocket wheel 45 effecting the drive and the other sprocket wheels preferably merely being followers or idlers. The operation of the motor 49 is preferably controlled from the same point as is used to control the actuation of the set shaft, the operation of the compressor motor 38 and other parts of the machine, e. g. from the sawyer's control table.

At intervals along the endless chain 46 are arranged a plurality of spaced dogs 52. The dogs 52 are preferably closely spaced along the chain 46 and there may, for example, be twelve such dogs; however, for the sake of clarity in the drawings, only four are illustrated. The part of each dog which is uppermost and which lies in front of the upward and rearwardly inclining front wall of the housing 22 as the dog travels up this wall is upwardly and forwardly inclined so as to constitute a tooth which will bite into the periphery of the log 6 in order to rotate the same about its axis.

The chain 46 is driven in a clockwise direction (as seen in Figures 3 and 6) so that the dogs 52 tend to bite into the lower part of the log when the log turning device is in operation, and then to lift the rear part of the log from behind and to raise it upwardly so as to cause the log to roll forwardly in the direction of the arrow A in Figures 3 and 6.

Conveniently the dogs 52 may be formed integrally with links inserted into the chain although they may be fixed over or onto existing links of the chain.

By arranging for the up-run of the chain 46 to incline upwardly and rearwardly at about 20° to the vertical as previously explained, a high efficiency of log turning is achieved as the upwardly moving dogs tend to roll the log away from the chain by which the dogs are carried whilst this chain recedes from the log as the chain travels upwardly.

It is also of substantial value to have the front run of the chain 46 resting upon the front upwardly and rearwardly inclined wall of the housing 22 during the time that the log turning device is in operation since this front wall of the housing gives adequate support to the chain and the dogs thereon when these are under rearward pressure from the log.

The housing 22 of the log turning device is normally set so that the front run of the chain 46 and the dogs thereon lie at a minimum of some two or three inches behind the front faces of the upstanding limbs 8 of the knees 7. However, when it is desired to turn the log 6, the housing 22 is advanced with respect to the head blocks 7 to a position in which the front run of the chain 46, and particularly the lower part thereof, is well in front of the upright limbs 8 of the knees 7 so that the dogs 52 on the chain can engage underneath the rear surface of the log and bite into the latter so that, as the chain continues to travel in its clockwise direction, the dogs will tend to lift the rear part of the log and cause the latter to turn forwardly about its axis. After the log turning operation has been effected the housing 22 is returned to its withdrawn position behind the front vertical faces of the knees.

The forward and rearward adjustment of the housing 22 with respect to the knees 7 is achieved by appropriate manipulation of the four-way control valve 34 which selectively effects the admission of compressed air to the appropriate end of the pneumatic cylinder 27 and thus controls which way the cylinder 27 will move with respect to the piston 29 which, it will be understood, remains stationary during the adjustment of the housing 22 since the set shaft 14 is, at this time, stationary and since the rack 26 only moves when the set shaft 14 is rotated.

When in operation to turn the log, the dogs 52 tend to roll the log forwardly from the log carriage so that it is desirable to restrain the log against undue displacement in this way; this restraint is conveniently effected by raising the restraining arms 15 into their vertical, or substantially vertical, positions shown in Figures 3 and 6. However, as the log is not of a purely circular form, and once it has had a flitch or board cut therefrom becomes far from circular. It is desirable that the arms 15 should bear on the log yieldingly or with some degree of resilience. Therefore the arrangement is preferably such that the arms 15 are raised through the medium of a pneumatic or hydraulic cylinder and piston assemblies 53, the operation of which can be controlled from a remote point in any suitable manner, the yielding or resilient action of the arms being illustrated in Figure 6 where a log is shown partially turned after having had a board removed from one surface so that the log has a flat side.

Reference to Figures 8 to 11 shows the method of operation with a log turning device constructed according to this invention and makes it abundantly clear that with such a device the log is turned through 90° after each cut so that the total rotation of the log is only 270°.

I claim:

1. A log saw-mill comprising a saw; a carriage for supporting a log to be sawn; means for reciprocating the carriage along the saw line between a loading station and a delivery station at opposite sides of said saw; head blocks slidably mounted on said carriage for positioning a log thereon; a set shaft operatively connected to said head blocks and rotatable to effect their movement across the carriage; a log turning device slidably mounted on said carriage and positioned on the same side of the log as said head blocks; a pinion carried by said set shaft; a rack engaging said pinion; a piston and cylinder assembly between said rack and said log turning device, whereby rotation of said set shaft causes movement of said log turning device in synchronism with said head blocks whereas actuation of said piston and cylinder assembly causes movement of said log turning device relatively to said head blocks; a plurality of sprockets rotatably mounted on said log turning device on axes parallel to the saw line; an endless chain engaged with said sprockets; a plurality of dogs mounted at intervals along said chain; means for driving at least one of said sprockets to move dogs in contact with said log upwardly; log loading means at said log loading station and positioned on the side of said carriage adjacent to said saw; at least one arm forming part of said log loading means; and fluid pressure means for moving said arm to an upright position to transfer a log from said loading means to said carriage and to prevent excessive transverse movement of said log away from said log turning device during a log turning operation.

2. A log saw-mill comprising a saw; a carriage for supporting a log to be sawn; means for reciprocating the carriage along the saw line between a loading station and a delivery station at opposite sides of said saw; head blocks slidably mounted on said carriage for positioning a log thereon; a set shaft operatively connected to said head blocks and rotatable to effect their movement across the carriage; a log turning device slidably mounted on said carriage and positioned on the same side of the log as said head blocks; a pinion carried by said set shaft; a rack engaging said pinion; a piston and cylinder assembly between said rack and said log turning device, whereby rotation of said set shaft causes movement of said log turning device in synchronism with said head blocks whereas actuation of said piston and cylinder assembly causes movement of said log turning device relatively to said head blocks; a plurality of sprockets rotatably mounted on said log turning device on axes parallel to the saw line; an endless chain engaged with said sprockets; a plurality of dogs mounted at intervals along said chain; means for driving at least one of said sprockets to move dogs in contact with said log upwardly; and means positioned on the side of said log remote from said log turning device to prevent excessive transverse movement of said log away from said log turning device during a log turning operation.

3. A log saw-mill comprising a saw; a carriage for supporting a log to be sawn; means for reciprocating the carriage along the saw line towards and away from the saw; head blocks slidably mounted on said carriage for positioning a log thereon; a set shaft operatively connected to said head blocks and rotatable to effect their movement across the carriage; a log turning device slidably mounted on said carriage and positioned on the same side of the log as said head blocks; a pinion carried by said set shaft; a rack engaging said pinion; a piston and cylinder assembly between said rack and said log turning device, whereby rotation of said set shaft causes movement of said log turning device in synchronism with said head blocks whereas actuation of said piston and cylinder assembly causes movement of said log turning device relatively to said head blocks; log-engaging means on said log turning device; means for moving said log-engaging means upwardly along a path diverging from the vertical and away from the log at an angle of substantially 20° to move upwardly the part of the log engaged thereby; and means positioned on the side of said log remote from said log turning device to prevent excessive transverse movement of said log away from said log turning device during a log turning operation.

4. In a log saw-mill, in combination: a carriage for supporting a log to be sawn; knees slidably mounted transversely on said carriage for positioning a log thereon; a set shaft operatively connected to said knees and rotatable to effect movement of the knees across the carriage; a log turner separate from the knees and also slidably mounted on said carriage; a pinion carried by said set shaft; a rack engaging said pinion; a piston and cylinder assembly between said rack and said log turner, whereby rotation of said set shaft causes sliding movement of said log turner in synchronism with said knees whereas actuation of said piston and cylinder assembly causes sliding movement of said log turner relatively to said knees; a plurality of sprockets rotatably mounted on said log turner; an endless chain engaged with said sprockets; a plurality of dogs mounted at intervals along said chain; and means for driving at least one of said sprockets to move dogs in contact with said log upwardly.

5. In a log saw-mill, in combination; a carriage for supporting a log to be sawn; knees slidably mounted transversely on said carriage for positioning a log thereon; a set shaft operatively connected to said knees and rotatable to effect movement of the knees across the carriage; a log turner separate from the knees and also slidably mounted on said carriage; means operatively connecting said set shaft to the log turner; motive means between said last mentioned means and said log turner, whereby rotation of the set shaft causes sliding movement of the log turner in synchronism with said knees whereas actuation of said motive means causes sliding movement of the log turner relatively to the knees; a plurality of sprockets rotatably mounted on said log turner; an endless chain engaged with said sprockets; a plurality of dogs mounted at intervals along said chain; and means for driving at least one of said sprockets to move dogs in contact with said log upwardly.

6. For combination with the carriage of a log saw-mill furnished with slidably mounted transverse knees for positioning a log on said carriage, a log turner comprising; a housing which is adjustable across said carriage and has a front upwardly and rearwardly inclined wall; a plurality of rotary components mounted in said housing, an endless flexible member engaged with said rotary components; log engaging and turning dogs on said endless member; means for driving at least one of said rotary components and hence also the endless member to move dogs which are to engage a log upwardly with the relevant portion of the endless member resting upon and being supported by the aforesaid front wall of the housing so that this portion travels along a predetermined fixed path upwardly and rearwardly across the rear of a log located on the carriage in front of the knees; and means for adjusting the log turner as a whole transversely with respect to the log carriage independently of the knees and without changing the obliquity of the said front wall of the housing.

7. For combination with the carriage of a log saw-mill furnished with slidably mounted transverse knees for positioning a log on said carriage, a log turner which is adjustable across said carriage and includes: an endless flexible member; log engaging and turning elements on said endless member; means driving the endless member and thereby moving the elements which are to engage a log upwardly; an inclined support for the log engaging portion of the endless member said support enabling the endless member to travel along a predetermined fixed path upwardly and rearwardly across the rear of a log located on the carriage in front of the said knees; and means for adjusting the log turner as a whole transversely with respect to the log carriage independently of the knees thereon and without changing the inclination of the aforementioned support.

References Cited in the file of this patent

UNITED STATES PATENTS

| | | |
|---|---|---|
| 141,969 | Van Vleck | Aug. 19, 1873 |
| 162,088 | Miles | Apr. 13, 1875 |
| 386,853 | Sherman | July 31, 1888 |
| 571,801 | Saltsman | Nov. 24, 1896 |
| 1,755,087 | Trullinger | Apr. 15, 1930 |
| 1,842,465 | Weber | Jan. 26, 1932 |
| 2,665,720 | Tangemann | Jan. 12, 1954 |
| 2,676,626 | Rumsey | Apr. 27, 1954 |
| 2,792,034 | Vaughan | May 14, 1957 |

FOREIGN PATENTS

| | | |
|---|---|---|
| 140,730 | Australia | Apr. 9, 1951 |